UNITED STATES PATENT OFFICE 2,448,853

SULFONAMIDO DISAZO DYE

Charles F. H. Allen, Charles V. Wilson, and Gordon F. Frame, Rochester, N. Y., assignors to Eastman Kodak Company, Rochester, N. Y., a corporation of New Jersey No Drawing. Application December 29, 1945, Serial No. 638,490

1 Claim. (Cl. 260—178)

This invention relates to azo compounds having the general formula:

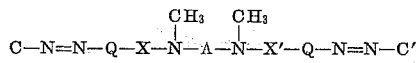

wherein A represents a single benzene nucleus, X and X' each represent a radical selected from the group consisting of

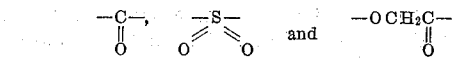

Q and Q' each represent a member selected from the group consisting of a single benzene nucleus and a single naphthalene nucleus, and C and C' each represent the residue of a coupling component selected from the group consisting of a benzene coupling component, a naphthalene coupling component and a tetrahydroquinoline coupling component.

We have discovered that the azo compounds having the above formula are, depending upon their particular structure, dyes for wool, organic derivatives of cellulose and cotton textile materials. It is accordingly an object of our invention to provide azo compounds which are suitable for the coloration of wool, organic derivatives of cellulose and cotton textile materials. Another object is to provide colored wool, organic derivatives of cellulose and cotton textile materials of good fastness properties. A further object is to provide a satisfactory method for the preparation of the azo compounds of the invention.

The azo compounds of our invention can be prepared by diazotizing an amine of the formula:

wherein A, Q, Q', R, R', X and X' have the meaning previously assigned to them and coupling the diazonium compound obtained with a benzene coupling component, a naphthalene coupling component or a tetrahydroquinoline coupling component. The diazonium compound can be coupled with two different coupling components or two proportions of the same coupling component. Where two coupling components are employed the amine is monodiazotized and coupled with one of the coupling components following which it is again diazotized and coupled with the second coupling component. Where only one coupling component is employed, the amine is normally tetrazotized and coupled with two gram molecular equivalent weights of the coupling component in one operation.

Coupling components that can be employed in the preparation of the azo compounds of our invention include, for example, 1-hydroxynaphthalene-5-sulfonic acid, 2-hydroxynaphthalene-7-sulfonic acid, 2-hydroxynaphthalene-6,8-disulfonic acid, 1-hydroxynaphthalene-3,6-disulfonic acid, 2-amino-8-hydroxynaphthalene-6-sulfonic acid, 2-amino-5-hydroxynaphthalene-7-sulfonic acid, 1-amino-8-hydroxynaphthalene-3,6-disulfonic acid, 1-acetamino-8-hydroxynaphthalene-3,6-disulfonic acid, 2-benzamido-5-hydroxynaphthalene-7-sulfonic acid, 1-hydroxynaphthalene-4-sulfonic acid, 1-amino-8-hydroxynaphthalene-2,4-disulfonic acid, 2-amino-8-hydroxynaphthalene-3,6-disulfonic acid, 2-hydroxynaphthalene-3,6-disulfonic acid, 1,8-dihydroxynaphthalene-3,6-disulfonic acid, 1-hydroxynaphthalene-3,8-disulfonic acid, N-β-hydroxyethyl-α-naphthylamine, N-β,γ-dihydroxypropyl-α-naphthylamine, 5-hydroxy-1-N-β,γ-dihydroxypropylaminonaphthalene, 5-hydroxy-1-N-β-hydroxyethylaminonaphthalene, 8-hydroxy-1-N-β,γ-dihydroxypropylaminonaphthalene, 1-amino-5-naphthol, N-ethyl-N-β-hydroxyethylaniline, N-β,γ-dihydroxypropylaniline, N-γ-hydroxypropylaniline, N-β-hydroxyethyl-m-toluidine, N,N-di-β-hydroxyethylaniline, N-β-hydroxypropyl-2-methoxy-5-methylaniline, N-methyl-N-β,γ-dihydroxypropyl-m-chloroaniline, N-4,5-dihydroxy-n-amylaniline, N-deltahydroxybutyl-m-anisidine, p-cresol, m-cresol, 4-acetamino-2-β,γ-dihydroxypropylaminoanisole, 1-β,γ-dihydroxypropyltetrahydroquinoline, 1-β,γ-dihydroxypropyl-7-methyltetrahydroquinoline, 1-β-hydroxyethyltetrahydroquinoline, 1-β,γ-dihydroxypropyl-2,7-dimethyltetrahydroquinoline, 1-β-hydroxypropyl-2-methyltetrahydroquinoline, 1-γ-hydroxypropyl-7-chlorotetrahydroquinoline, 1-(4,5-dihydroxy-n-amyl)tetrahydroquinoline, 1-β,γ-dihydroxypropyl-7-acetylaminotetrahydroquinoline and 1-β,γ-dihydroxypropyl-5-acetylaminotetrahydroquinoline.

Amine compounds that can be employed in the preparation of the azo compounds of our invention include, for example:

(1) N,N'-di-(4-aminobenzoyl)-N,N'-dimethyl-p-phenylenediamine

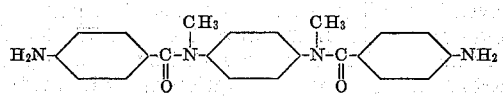

(2) N,N'-di-(3-aminobenzenesulfonyl)-N,N'-dimethyl-p-phenylenediamine

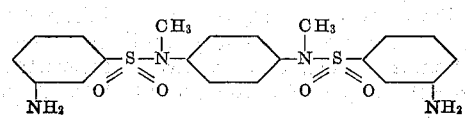

(3) N,N'-di-(4-aminobenzenesulfonyl)-N,N'-dimethyl-p-phenylenediamine (4) N,N'-di-(4-aminophenoxyacetyl)-N,N'-dimethyl-p-phenylenediamine)

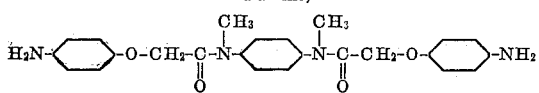

(5) N,N'-di-(1-amino-2-naphthoxyacetyl)-N,N'-dimethyl-p-phenylenediamine

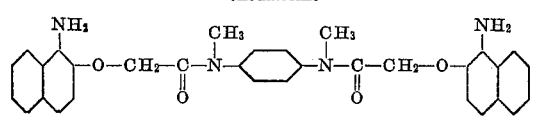

(6) N,N'-di-(2-amino-3-naphthoyl)-N,N'-dimethyl-p-phenylenediamine

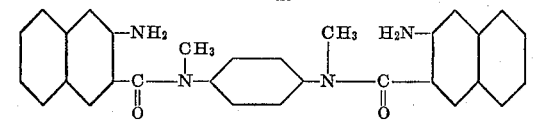

(7) N,N'-di-(1-amino-5-naphthalenesulfonyl)-N,N'-dimethyl-p-phenylenediamine

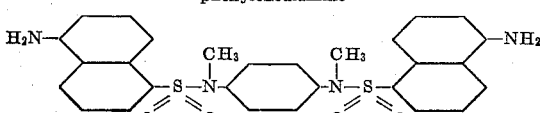

(8) N,N'-di-[4-(4-aminobenzamido)-benzoyl]-N,N'-dimethyl-p-phenylenediamine

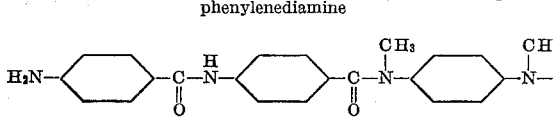

(9) N,N'-di-(4-amino-2-sulfobenzoyl)-N,N'-dimethyl-p-phenylenediamine

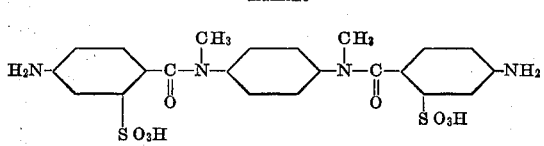

(10) N,N'-di-(1-amino-4-naphthalenesulfonyl)-N,N'-dimethyl-p-phenylenediamine

(11) N,N'-di-(4-amino-3-sulfobenzoyl)-N,N'-dimethyl-p-phenylenediamine

It is to be noted that the amines have been numbered for purposes of simplification and will, at times, be referred to hereinafter by number. Thus, for example, amine 1 refers to N,N'-di-(4-aminobenzoyl) - N,N' - dimethyl-p-phenylenediamine and it will be understood that this amine is meant when reference is made to amine 1.

The following examples illustrate the azo compounds of our invention and their manner of preparation. Parts are expressed as parts by weight.

*Example 1*

1.24 parts of N,N'-di-(3-aminobenzenesulfonyl)-N,N'-dimethyl-p-phenylenediamine are dissolved in a hot solution of 2 parts of hydrochloric acid (sp. gr. 1.19) in 20 parts of water. While stirring the solution is cooled with ice to 5° C. and 3.2 parts of a 12% aqueous solution of sodium nitrite are added. When the diazotization reaction which takes place is complete, the diazonium solution resulting is added to a solution of 1.5 parts of 5-hydroxy-1-glycerylaminonaphthalene in 30 parts of water and 1.5 parts of concentrated hydrochloric acid (sp. gr. 1.19) at 5° C. A solution of sodium acetate in water is slowly added until coupling begins, and coupling is continued for several hours at room temperature. The reaction mixture is then made slightly alkaline with sodium hydroxide and the precipitated red dye is recovered by filtration and dried. The dye compound obtained has the formula:

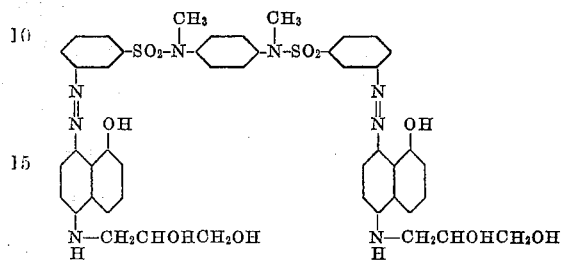

It dyes cellulose acetate rayon rose colored shades.

*Example 2*

10 parts of N,N'-di-(4-aminobenzoyl)-N,N'-dimethyl-p-phenylenediamine are added to 100 parts of water and 20 parts of hydrochloric acid (sp. gr. 1.19) and diazotized at a temperature of 5°–10° C. by the addition of 3.8 parts of sodium nitrite dissolved in water. The reaction mixture is stirred at 5°–10° C. for thirty minutes.

One-fourth of the diazonium mixture prepared as described above is added to a solution of 3.6 parts of 1-hydroxynaphthalene-4-sulfonic acid (NW acid) in 25 parts of water and 5 parts of 40% sodium hydroxide. The coupling reaction which takes place is allowed to proceed for three hours after which the dye compound formed is salted out by adding sodium chloride. It is purified by dissolving in water and again salting out with sodium chloride. The dye compound obtained has in its free acid form the formula:

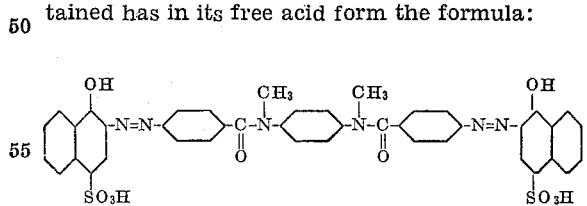

A yield of 3.6 parts is obtained. It dyes wool a light scarlet shade.

*Example 3*

To a solution of 5.5 parts of 1-amino-8-naphthol-2,4-disulfonic acid (2S acid) in 50 parts of water and 5 parts of 40% sodium hydroxide is added ¼ of the diazonium solution formed in Example 2. The coupling reaction which takes place is allowed to proceed for three hours. The dye compound formed is obtained by evaporating the reaction mixture to dryness and extracting the residue with methanol. Four parts of the dye compound are recovered from the methanol extract upon removal of the methanol. The dye compound obtained has in its free acid form the formula:

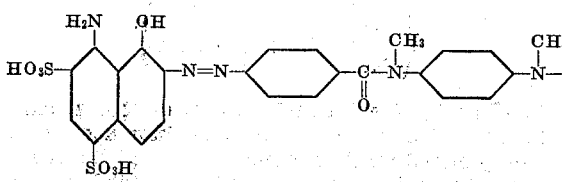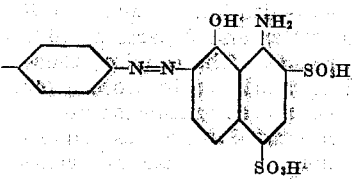

It dyes wool blue-red (magenta) shades. By the substitution of an equivalent molecular weight of 2-amino-8-hydroxynaphthalene-3,6-disulfonic acid (2R acid) for 2S acid in the foregoing example, a disazo dye compound is obtained which colors wool brownish-red shades. Coupling is believed to occur in the 7-position of the naphthalene nucleus. Similarly, if an equivalent molecular weight of 1-acetamino-8-hydroxynaphthalene-3,6-disulfonic acid (acetyl H acid) is substituted for 2S acid in the foregoing example, a disazo dye compound is obtained which colors wool bluish-red shades. Coupling is believed to occur in the 7-position of the naphthalene nucleus.

*Example 4*

One-fourth of the diazonium solution prepared in Example 2 is added to a solution of 4.9 parts of 2-hydroxynaphthalene-3,6-disulfonic acid (R acid) in 35 parts of water and 5 parts of 40% aqueous sodium hydroxide solution. The dye precipitates as it is formed. It is purified by dissolving in water and salting out with sodium chloride from a dilute solution. The dye compound obtained has in its free acid form the formula:

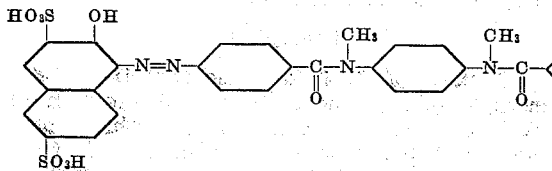

It dyes wool a brilliant scarlet which is somewhat more red than the dyeing obtained with the dye of Example 2.

*Example 5*

A mixture of 4 parts of N,N'-di-(4-aminobenzoyl)-N,N'-dimethyl-p-phenylenediamine, 40 parts of water and 6 parts of hydrochloric acid (sp. gr. 1.19) is diazotized by treatment with 12.3 parts of a water solution of sodium nitrite containing 12 parts of the salt to 100 parts of solution.

The diazonium solution obtained above is added to 3.88 parts of N-ethyl-N-β-hydroxyethylaniline, 60 parts of water and 4 parts of hydrochloric acid (sp. gr. 1.19). Sodium acetate is then added until coupling begins and after coupling for three hours the mixture has a pH of 1.5. The reaction mixture is then made alkaline with sodium hydroxide and the precipitated yellow dye is collected on a filter, washed with water and dried. The disazo dye compound obtained dyes cellulose acetate yellow shades. Coupling occurs in p-position to the nitrogen atom of the coupling component.

*Example 6*

1.5 parts of N,N'-di-(4-aminobenzenesulfonyl)-N,N'-dimethyl-p-phenylenediamine are diazotized in 25 parts of water and 2.3 parts of hydrochloric acid (sp. gr. 1.19) with 3.9 parts of a 12% sodium nitrite water solution. Upon completion of the diazotization reaction, the diazonium mixture is added to 1.71 parts of 4-acetamino-2-β,γ-dihydroxypropylaminoanisole in 30 parts of water and 1.3 parts of hydrochloric acid (sp. gr. 1.19). The coupling reaction which takes place is allowed to proceed overnight at room temperature following which the reaction mixture is heated to boiling and filtered while hot. On making the filtrate faintly alkaline with sodium hydroxide a reddish colored disazo dye (1.2 parts) is precipitated. Coupling occurs in the 5-position of the coupling component. The dye compound obtained colors cellulose acetate rayon a salmon-pink color.

*Example 7*

5 parts of N,N'-di-(4-aminophenoxyacetyl)-N,N'-dimethyl-p-phenylenediamine are diazotized in 50 parts of water and 10 parts of hydrochloric acid (sp. gr. 1.19) with sodium nitrite in the usual manner.

One-half of the diazonium solution prepared as described above is added to a solution of 3.1 parts of 1-hydroxynaphthalene-4-sulfonic acid in 35 parts of water and 5 parts of a 40% aqueous sodium hydroxide solution. The coupling reaction which takes place is allowed to proceed for 3 hours and the resulting diazo dye is obtained from the reaction mixture by salting out with sodium chloride. Coupling occurs in the 2-position of the coupling component. The dye compound obtained dyes wool a brilliant red shade from an acid bath.

*Example 8*

One-half of the diazonium solution prepared as described in Example 7 is added to a solution of 4.3 parts of 1-amino-8-hydroxynaphthalene-2,4-disulfonic (2S acid) in 35 parts of water and 5 parts of 40% aqueous sodium hydroxide solution. The coupling reaction which takes place is allowed to proceed for three hours. The reaction mixture is then filtered and the filtrate evaporated to dryness. The residue is then extracted with methanol and the disazo dye is recovered from the methanol extract by removal of the methanol. Coupling occurs in the 2-position of the 2S acid. The dye compound obtained dyes wool a deep magenta color from an acid bath.

*Example 9*

0.7 part of N,N'-di-(1-amino-2-naphthoxyacetyl)-N,N'-dimethyl-p-phenylenediamine are diazotized in 15 parts of water and one part of hydrochloric acid (sp. gr. 1.19) with sodium nitrite in the usual manner. The diazonium solution obtained is added to a solution of 0.9 part of 1-amino-8-naphthol-2,4-disulfonic acid (2S acid) in 15 parts of water and 2 parts of 40% aqueous sodium hydroxide. The coupling reaction which takes place is allowed to proceed for several hours and the mixture resulting is filtered. The filtrate is then evaporated to dryness and extracted with methanol. The disazo dye compound formed is recovered from the methanol extract by removal of the methanol. The dye compound obtained colors wool a reddish-brown shade from an acid bath.

*Example 10*

2.5 parts of N,N'-di-(3-aminobenzenesulfonyl)-N,N'-di-methyl-p-phenylenediamine are dissolved in a boiling solution of 5 parts of hydrochloric acid (36%) in 25 parts of water. The solution is stirred while cooling so that the amine hydrochloride salt precipitates from solution in a finely divided condition. Then ice is added to bring the temperature to about 5° C. and 6.4 parts of a 12% aqueous sodium nitrite solution are added while stirring. When the diazotization reaction which takes place is complete, which is the case in about 15 minutes, the diazonium solution resulting is added with stirring to a solution of 3 parts of 1-naphthol-4-sulfonic acid (NW acid) in 35 parts of water and 2.8 parts of sodium hydroxide. The coupling reaction which takes place and which occurs in the 2-position of the NW acid is continued for one hour. The disazo orange dye formed is isolated by adding sodium chloride and for purification it is salted out twice with sodium chloride from its solution in water. It dyes wool orange from an acid bath.

*Example 11*

Two parts of N,N'-di-(4-aminobenzoyl)-N,N'-dimethyl-p-phenylenediamine are dissolved in 25 parts of water and 3 parts of hydrochloric acid (sp. gr. 1.19) and the resulting solution is cooled with ice to 5° C. Then while stirring, 6.0 parts of 12% sodium nitrite solution are added and stirring is continued for 15 minutes while maintaining the reaction mixture at about 5° C. Upon completion of the diazotization reaction the diazonium mixture resulting is added to a solution of 0.65 part (1 equivalent) of 2,4-diaminotoluene in 15 parts of water and 1 part of hydrochloric acid (sp. gr. 1.19) and stirring is continued one and a quarter hours at 5°–10° C. Coupling is believed to occur principally in the 5-position. The product formed is recovered by filtration and then added to a solution of 2.5 parts (1 equivalent) of 2-naphthol-3,6-disulfonic acid (R-acid) in 20 parts of water and 2 parts of sodium carbonate and the alkaline solution is stirred for 2 hours at room temperature. The orange dye precipitates out as formed. It is recovered by filtration and dried. It dyes wool an orange color from an acid bath.

*Example 12*

1.6 parts of N,N'-di-(4-aminophenoxyacetyl)-N,N'-dimethyl-p-phenylenediamine are diazotized in the customary manner in 15 parts of water and 2 parts of hydrochloric acid (sp. gr. 1.19) with 4.2 parts of 12% aqueous sodium nitrite solution.

The diazonium solution formed above is added while stirring to a solution of 0.72 part (1 equivalent) of m-aminooxanilic acid

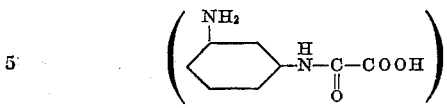

in 15 parts of water and 0.2 part of sodium carbonate. Then a solution of sodium acetate is slowly added until coupling begins and the reaction mixture is stirred one and a quarter hours at 5°–10° C., following which the yellow solution resulting is added to a solution of 0.87 part (1 equivalent) of 2-naphthol-3,6-disulfonic acid (R-acid) in 20 parts of water and 1.5 parts of sodium carbonate. A red disazo dye begins to precipitate almost immediately and after stirring for about one hour, it is recovered by filtration and dried. In this manner 4.0 parts of the dye are obtained. It colors wool red shades.

*Example 13*

The dye formed as in Example 12 is dissolved in 100 parts of water, 2 parts of hydrochloric acid (sp gr. 1.19) are added and the dye is diazotized by adding 2.2 parts of a 12% sodium nitrite solution while keeping the temperature at 5°–10° C. Stirring is continued for 30 minutes. Then the solution resulting is added to a solution of 0.87 part (1 equivalent) of 2-naphthol-3,6-disulfonic acid (R-acid) in 35 parts of water and 2 parts of sodium carbonate. The reaction mixture turns a deeper red in color and a trisazo dye precipitates. After stirring for about one hour, the dye is recovered by filtration. It is purified by dissolving in about 300 parts of hot water and precipitating by the addition of an equal volume of saturated sodium chloride solution. It dyes wool deep red from an acid bath.

*Example 14*

0.3 part of N,N'-(4-aminobenzoyl)-N,N'-dimethyl-p-phenylenediamine are dissolved in 10 parts of water and 0.5 part of hydrochloric acid (sp. gr. 1.19). The reaction mixture is then cooled with ice to 5° C. and diazotized by adding, with stirring, 1.8 parts of a 6% aqueous sodium nitrite solution and the reaction mixture is stirred until diazotization is complete (about 15 minutes).

The diazonium solution prepared as described above is added to a suspension of 0.43 part of 2-ethoxy-1-naphthylamine-6-sulfonic acid in 10 parts of water. While stirring, dilute sodium acetate solution is added to give the reaction mixture a pH of 4.2. The coupling reaction which takes place is continued for 4 hours at 5°–10° C. Coupling is completed by the careful addition of a dilute aqueous sodium hydroxide solution to obtain a pH of 5.3 and finally a pH of 6.0. A red insoluble disazo dye is formed. It is coagulated by boiling the reaction mixture, and after cooling it is recovered by filtration, washed with water and dried. It colors wool red shades.

*Example 15*

The dye formed as described in Example 14 is dispersed in 50 parts of water, 0.3 part of a 40% aqueous sodium hydroxide solution are added and then the reaction mixture is heated to boiling and stirred while cooling with ice to 5°–10° C. 1.5 parts of hydrochloric acid (sp. gr. 1.19) are added and the dye is completely diazotized by adding 1.8 parts of a 6% aqueous sodium nitrite solution. The reaction mixture is stirred for one half hour at 5°–10° C. and then added to a solution of 0.53 part of 1,8-dihydroxynaphthalene-3,6-disulfonic acid in 25 parts of water and 0.8 part of sodium hydroxide. The reaction mixture resulting is stirred for 1 hour and then allowed to stand overnight at room temperature. The red-brown tetrakisazo dye formed is soluble and is precipitated by the addition of an equal volume of a saturated sodium chloride solution. After boiling to coagulate the dye and cooling, the dye is recovered by filtration and dried. It dyes wool a dull red which turns yellow-brown upon chroming.

Similarly by diazotizing both amino groups of the amines listed hereinafter and coupling the diazonium compounds obtained in an alkaline medium with two molecular equivalent weights of the coupling components listed hereinafter in accordance with the procedure described in the foregoing examples, especially that disclosed in Examples 2, 3, 4, 7, 8, 9, 10 and 14, disazo dye compounds of our invention can be prepared. The color given is that of the dyeing obtained on wool, unless otherwise specified.

| Amine | Coupling Component | Color |
|---|---|---|
| 1 | 1,8-dihydroxynaphthalene-3,6-disulfonic acid | bluish-red. |
| 1 | 1-hydroxynaphthalene-5-sulfonic acid | dull orange. |
| 1 | 2-hydroxynaphthalene-7-sulfonic acid | reddish-orange. |
| 1 | 2-hydroxynaphthalene-6,8-disulfonic acid | yellow-orange. |
| 1 | 1-hydroxynaphthalene-3,6-disulfonic acid | reddish-orange. |
| 1 | 2-amino-8-hydroxynaphthalene-6-sulfonic acid | reddish-brown. |
| 1 | 2-amino-5-hydroxynaphthalene-7-sulfonic acid | orange cotton—old rose. |
| 1 | 2-benzamido-5-hydroxynaphthalene-7-sulfonic acid | reddish-orange cotton— Do. |
| 1 | 1-amino-8-hydroxynaphthalene-3,6-disulfonic acid | reddish-violet. |
| 1 | 1-hydroxynaphthalene-3,8-disulfonic acid | reddish-orange. |
| 2 | 1-amino-8-hydroxynaphthalene-2,4-disulfonic acid | brownish-red. |
| 2 | 1-hydroxynaphthalene-4-sulfonic acid | orange. |
| 9 | 1-amino-8-hydroxynaphthalene-3,6-disulfonic acid | red. |
| 9 | β-naphthol | Do. |
| 11 | 1-amino-8-hydroxynaphthalene-3,6-disulfonic acid | Do. |
| 11 | β-naphthol | Do. |

Likewise, by diazotizing both amino groups of the amines listed hereinafter and coupling the diazonium compounds obtained in an acid medium with two molecular equivalent weights of the coupling components listed hereinafter in accordance with the procedure described in the foregoing examples, especially that disclosed in Examples 1, 5, 6 and 11, disazo dye compounds of our invention can be prepared. The color given is that of the dyeing obtained on cellulose acetate rayon.

N-ethyl-N-β,γ-dihydroxypropyl-m-anisidine, N-β,γ-dihydroxypropyl-7-methyl-1,2,3,4-tetrahydroquinoline, 1-hydroxynaphthalene-4-sulfonic acid or 1-amino-8-naphthol-2,4-disulfonic acid, amine 4 can be diazotized and coupled with N-β-hydroxyethylaniline, N-β,γ-dihydroxypropyl-1,2,3,4-tetrahydroquinoline, 2-amino-8-hydroxynaphthalene-3,6-disulfonic acid or 5-hydroxy-1-β,γ-dihydroxypropylaminonaphthalene, amine 5 can be diazotized and coupled with N-β-hydroxyethyl-m-toluidine, N-β,γ-dihydroxypropyl-1,2,3,4-tetrahydroquinoline, 1-hydroxynaphthalene-4-sulfonic acid or 1-amino-8-naphthol-2,4-disulfonic acid, amine 6 can be diazotized and coupled with N-ethyl-N-β-hydroxyethylaniline, N-β,γ-dihydroxypropyl-7-methyl-1,2,3,4-tetrahydroquinoline, 1-hydroxynaphthalene-4-sulfonic acid or 1-amino-8-naphthol-2,4-disulfonic acid, amine 7 can be diazotized and coupled with N,N-di-(β-hydroxyethyl)-aniline, N-β-hydroxyethyl-7-chloro-1,2,3,4-tetrahydroquinoline, 1-hydroxy-naphthalene-4-sulfonic acid or 1-amino-8-naphthol-2,4-disulfonic acid, amine 8 can be diazotized and coupled with N-ethyl-N-β,γ-dihydroxypropylaniline, N-β,γ-dihydroxypropyl-7-methyl-1,2,3,4-tetrahydroquinoline, 1-naphthol-4-sulfonic acid or 1-amino-8-naphthol-2,4-disulfonic acid, amine 9 can be diazotized and coupled with N-ethyl-N-β-hydroxyethyl-m-toluidine, N-β,γ-dihydroxypropyl-1,2,3,4-tetrahydroquinoline, 5-hydroxy-1-ethyl-aminonaphthalene or 1-naphthol-4-sulfonic acid, amine 10 can be diazotized and coupled with N,N-di-(β-hydroxyethyl)-aniline, N-β,γ-dihydroxypropyl-1,2,3,4-tetrahydroquinoline, 1-naph-

| Amine | Coupling Component | Color |
|---|---|---|
| 1 | N,N-di-(β-hydroxyethyl)-aniline | yellow. |
| 1 | N-β,γ-dihydroxypropyl-7-methyl-1,2,3,4-tetrahydroquinoline | red. |
| 1 | N-β-hydroxyethyl-7-methyl-1,2,3,4-tetrahydroquinoline | Do. |
| 1 | N-ethyl-N-β-hydroxyethylaniline | yellow. |
| 2 | 5-hydroxy-1-β-hydroxyethylamino-naphthalene | reddish-violet. |

It will be understood that the foregoing examples are intended to be illustrative and not limitative of our invention as many other dye compounds included within the scope of our invention not specifically referred to hereinbefore can be prepared. To illustrate amine 1 can be diazotized and coupled with N,N-di-β-(hydroxyethyl)-m-toluidine, β-naphthol or N-β,γ-dihydroxypropyl-2,7-dimethyl-1,2,3,4-tetrahydroquinoline, amine 2 can be diazotized and coupled with β-naphthol, N-β,γ-dihydroxypropyl-1,2,3,4-tetrahydroquinoline, N-ethyl-N-β-hydroxyethylaniline, 2-amino-8-hydroxynaphthalene-6-sulfonic acid or 1-hydroxynaphthalene-4-sulfonic acid, amine 3 can be diazotized and coupled with thol-4-sulfonic acid, 1-amino-8-naphthol-2,4-disulfonic acid or 5-hydroxy-1-β,γ-dihydroxypropylaminonaphthalene and amine 11 can be coupled with N-n-butyl-N-β-hydroxyethylaniline, N-β,γ-dihydroxypropyl-7-methyl-1,2,3,4-tetrahydroquinoline, 1-naphthol-4-sulfonic acid or 5-hydroxy-1-β,γ-dihydroxypropylaminonaphthalene, for example. It will be understood that in forming the disazo dyes referred to above one molecular equivalent weight of the amine is completely diazotized and coupled with two molecular equivalent weights of the coupling component.

Disazo dyes of our invention containing two different coupling components can be prepared after the general procedure described in Example 11. To illustrate, each of amines 1 to 11, inclusive, can be monodiazotized and the diazonium compounds obtained coupled with an equivalent molecular weight of m-toluidine. The resulting monoazo compounds are then diazotized and the diazonium compounds in turn coupled with 1-naphthol-4-sulfonic acid to obtain disazo dye compounds of the invention. Similarly, 1-amino-8-naphthol-2,4-disulfonic acid, N-$\beta,\gamma$-dihydroxypropyl-7-methyl-1,2,3,4-tetrahydroquinoline or 5-hydroxy-1-$\beta,\gamma$-dihydroxypropylaminonaphthalene, for example, can be substituted for the 1-naphthol-4-sulfonic acid. Likewise 2,4-diaminotoluene, 1-amino-5-naphthol and $\alpha$-naphthylamine, for example, can be substituted for m-toluidine.

The aminobenzene type compounds, such as amines 1, 2, 3, 4, 8, 9 and 11, used in the manufacture of the azo compounds of our invention are prepared by reacting an N,N'-di-(low carbon alkyl group)-phenylenediamine with two molecular equivalent weights of a nitrobenzoyl halide, a nitrobenzenesulfonyl halide or a nitrophenoxyacetyl halide, as the case may be, and then reducing the nitro groups to amino groups. The aminonaphthalene type compounds, such as amines 5, 6, 7 and 10, can be prepared by reacting an N,N'-di-(low carbon alkyl group)-phenylenediamine with two molecular equivalent weights of an acetamino naphthoyl halide, an acetamino naphthalenesulfonyl halide or an acetamino naphthoxyacetyl halide. Representative of the benzene and naphthalene halide compounds that can be used may be mentioned p-nitrobenzoyl chlorine, p-nitrophenoxyacetyl chloride, m-nitrobenzenesulfonyl chloride, p-nitrobenzenesulfonyl chloride, m-nitrobenzoyl chloride, 4-(4'-nitrobenzamide)-benzoyl chloride, 4-nitro-2-sulfobenzoyl chloride, 4-nitro-3-sulfobenzoyl chloride, 1-acetamino-2-naphthoxyacetyl chloride, 2-acetamino-3-naphthoyl chloride and 1-acetamino-5-naphthalenesulfonyl chloride.

The following examples illustrate the manner of preparation of the amine compounds of the invention. Parts are expressed by weight.

*Example A. — N,N'-di-p-aminobenzoyl - N,N'-dimethyl-p-phenylenediamine*

Fifteen parts of N,N'-dimethyl-p-phenylenediamine dioxalate were suspended in a solution of 15.7 parts of sodium carbonate in 200 parts of water. Then, while stirring, 29.5 parts of p-nitrobenzoyl chloride were added, and the mixture was stirred first at room temperature for 30 minutes and then at 50°–60° C. for 3 hours. On cooling, the precipitated brownish solid was collected on a filter paper, pressed dry, and extracted with 350 parts of boiling ethyl alcohol to remove any unreacted p-nitrobenzoyl chloride or p-nitrobenzoic acid. Working in this manner, 14.2 parts of the crude product N,N'-di-p-nitrobenzoyl-N,N'-dimethyl-p-phenylenediamine were obtained. After recrystallizing from 200 parts of glacial acetic acid a substantially pure product was obtained in the form of slightly yellow needles which melt at 256° C.

For the reduction to the amino compound, 7.7 parts of the nitro compound obtained above were suspended in 150 parts of ethyl alcohol and reduced with hydrogen at 90°–100° C. in the presence of Raney nickel. The reduction took place readily. On cooling, the mixture of amino compound and nickel was filtered, and the amino compound was separated by extraction with 150 parts of boiling 1,4-dioxane. On cooling the 1,4-dioxane extraction mixture, 3.7 parts of the product, N,N'-di-p-aminobenzoyl-N,N'-dimethyl-p-phenylenediamine, separated in the form of white needles which melt at 255° C.

*Example B. — N,N'-di-m-nitrobenzenesulfonyl-N,N'-dimethyl-p-phenylenediamine*

A. *From the oxalate.*—To a solution of 79 parts of N,N'-dimethyl-p-phenylenediamine oxalate in 1000 parts of water were added 85 parts of sodium carbonate. After foaming subsided, 120 parts of m-nitrobenzenesulfonyl chloride were added, and the mixture resulting was heated on a steam bath with stirring for 3 hours. The reaction mixture became very dark. After cooling, it was filtered and the residue collected on the filter (167 parts) was washed several times with cold water and then extracted with 1000 parts of boiling ethyl alcohol. The residue remaining after the ethyl alcohol extraction was recrystallized from 1,4-dioxane and decolorized with charcoal, 85 parts of material melting at 215°–217° C. were obtained. The yield was about 68% of the theoretical, based on the diamine oxalate.

B. *From the free base.*—A mixture of 7 parts of N,N'-dimethyl-p-phenylene diamine (free base), 25 parts of m-nitro-benzenesulfonyl chloride and 25 parts of sodium carbonate in 200 parts of water was shaken intermittently for ½ hour and then allowed to stand at room temperature for 48 hours. The solid material formed was recovered by filtration, extracted with ethyl alcohol and the residue remaining from the ethyl alcohol extraction was crystallized from acetic acid. 7 parts of the desired product melting at 215–216° C. were obtained.

5 parts of the nitro compound obtained above were suspended in 125 parts of 1,4-dioxane and reduced with hydrogen at 90°–100° C. in the presence of Raney nickel. The reduction took place readily. The mixture was heated to the boiling point and filtered while hot. Upon cooling the desired amine compound separated and was recovered by filtration. It melts at 218° C.

*Example C. — N,N'-di-p-aminophenoxyacetyl-N,N'-dimethyl-p-phenylenediamine*

To a suspension of 37.2 parts of N,N'-dimethyl-p-phenylenediamine dioxalate in 500 parts of water containing 36.6 parts of sodium carbonate, 77.4 parts of p-nitrophenoxyacetyl chloride were added and the resulting mixture was stirred overnight at room temperature, and then for one hour at 50°–60° C. On cooling, the dark colored solid which precipitated was recovered by filtration, pressed dry, and recrystallized from glacial acetic acid. In this manner, 22.1 parts of N,N'-di-p-nitrophenoxyacetyl - N,N' - dimethyl - p - phenylenediamine were obtained as buff-colored needles which melt at 233° C.

22.1 parts of the nitro compound obtained above were suspended in 400 parts of ethyl alcohol and reduced with hydrogen at 90°–100° C. in the presence of Raney nickel. On cooling, the reaction mixture was filtered and the residue obtained on the filter was washed with 100 parts of boiling 1,4-dioxane to extract the desired product. On cooling the 1,4-dioxane extraction mixture 6.0 parts of the product, N,N'-di-p-aminophenoxyacetyl - N,N' - dimethyl-p-phenylenediamine were obtained as a slightly yellow solid which melts at 207° C.

*Example D. — N,N'-di-(1-amino-2-naphthoxy-acetyl)-N,N'-dimethyl-p-phenylenediamine*

To a mixture of 2.12 parts of N,N'-dimethyl-p-phenylenediamine oxalate and 2.0 parts of sodium carbonate in 50 parts of water was added 5.0 parts of 1-nitro-2-naphthoxyacetyl chloride. The resulting mixture was stirred overnight at room temperature. The precipitated solid was recovered by filtration and washed with water; for purification it was then heated with 50 parts of boiling alcohol and the precipitated solid was recovered by filtration after cooling. In this manner 1.6 parts of N,N'-di-(1-nitro-2-naphthoxy-acetyl)-N,N'-dimethyl-p-phenylenediamine was obtained. It melts above 275° C.

The nitro compound obtained as described above was suspended in 120 parts of alcohol and reduced with hydrogen in the presence of Raney nickel in the customary manner. On concentrating the alcohol solution to a small volume, the desired product separated as buff-colored crystals and was recovered by filtration.

*Example E.—N,N'-di-(4-aminobenzenesulfonyl)-N,N'-dimethyl-p-phenylenediamine*

To a suspension prepared from 29.3 parts of N,N'-dimethyl-p-phenylenediamine in 800 parts of water containing 75 parts of sodium carbonate, 45.7 parts of p-nitrobenzenesulfonyl chloride were added and the mixture was heated with stirring on the steam bath for two hours. After cooling, the solid which precipitated was recovered by filtration, washed with water and extracted with 400 parts of boiling ethyl alcohol. Upon evaporation of the alcohol N,N'-di-p-nitrobenzenesulfonyl-N,N'-dimethyl-p-phenylenediamine is obtained as a light gray solid which melts above 300° C. Working in the manner described 34.3 parts of nitro compound were obtained.

The nitro compound obtained above was reduced to the corresponding amino compound by suspending it in ethyl alcohol and reducing with hydrogen in the presence of Raney nickel in known fashion. On concentrating the alcohol solution to a small volume after removing the nickel by filtration, the desired product separated as a slightly yellowish solid which melts at 212–226° C. (decomposes). 7.4 parts of the diamino compound were obtained.

*Example F. — N,N'-dimethyl-N,N'di-(2-sulfo-4-aminobenzoyl)-p-phenylenediamine*

15 parts of N,N'-dimethyl-p-phenylenediamine (free base) were added to the aromatic acid chloride (obtained from 21 parts of thionyl chloride, 300 parts of pyridine and 43 parts of monopotassium salt of 4-nitro-2-sulfobenzoic acid) and the mixture resulting was stirred on the steam bath for 3 hours. On cooling, 18 parts of N,N'-dimethyl-N,N'-di-(2-sulfo-4-nitrobenzoyl)-p-phenylenediamine were separated as a white crystalline compound.

The product obtained above was reduced with hydrogen in the presence of Raney nickel in known fashion with ethyl alcohol as the solvent medium. Upon filtration, to remove the nickel, and evaporation of the filtrate the desired amine compound is obtained as a white solid. It is extremely soluble in water and can be purified by recrystallization from dilute hydrochloric acid. Considerable loss is involved in the purification process.

*Example G.—N,N'-dimethyl-N,N'-di-(3-sulfo-4-aminobenzoyl)-p-phenylenediamine*

This compound can be obtained by reacting N,N'-dimethyl-p-phenylenediamine with 3-sulfo-4-nitrobenzoyl chloride and reducing the nitro compound obtained to the corresponding amine compound. The reactions can be carried out in accordance with the procedure described in Example F.

*Example H.—N,N'-di-(2-amino-3-naphthoyl)-N,N'-dimethyl-p-phenylenediamine*

This compound can be obtained by reacting N,N'-dimethyl-p-phenylenediamine with 2-acetamino-3-naphthoyl chloride and removing the acetyl groups from the compound thus obtained by hydrolysis. 2-acetamino-3-naphthoyl chloride can be prepared by acetylating 2-amino-3-naphthalene carboxylic acid to obtain 2-acetamino-3-naphthalene carboxylic acid which is then converted to its acid chloride form (2-acetamino-3-naphthoyl chloride) by treatment, for example, with $PCl_5$.

*Example I.—N,N'-di-(1-amino-5-naphthalenesulfonyl)-N,N'-dimethyl-p-phenylenediamine*

This compound can be obtained by reacting N,N'-dimethyl-p-phenylenediamine with 1-acetamino-5-naphthalenesulfonyl chloride and removing the acetyl groups from the compound thus obtained by hydrolysis.

The above compound also can be obtained by reacting N,N'-dimethyl-p-phenylenediamine with 1-nitro-5-naphthalenesulfonyl chloride and reducing the nitro compound obtained to its amine form. The reduction can be carried out by treatment with hydrogen in the presence of Raney nickel and in the absence of a solvent medium such as ethyl alcohol.

*Example J.—N,N'-di-4-(4-aminobenzamido)-benzoyl-N,N'-dimethyl-p-phenylenediamine*

This compound can be obtained by reacting N,N'-dimethyl-p-phenylenediamine with 4-(4-nitrobenzamido)-benzoyl chloride and reducing the nitro compound obtained to the amine form. The reduction can be carried out with hydrogen in the presence of Raney nickel in the manner hereinbefore described.

*Example K.—N,N'-di-(1-amino-4-naphthalenesulfonyl)-N,N'-dimethyl-p-phenylenediamine*

This compound can be obtained by reacting N,N'-dimethyl-p-phenylenediamine with 1-acetamino-4-naphthalenesulfonyl chloride and removing the acetyl groups from the compound thus obtained by hydrolysis.

The above compound also can be obtained by reacting N,N'-dimethyl-p-phenylenediamine with 1-nitro-4-naphthalenesulfonyl chloride and reducing the nitro compound obtained to its amine form. The reactions involved can be carried out in accordance with the procedure hereinbefore described.

It will be understood, as previously indicated, that in Examples A to K, inclusive, at least two molecular equivalent weights of the aromatic halide compound to one of the phenylenediamine compound are employed.

The azo compounds of our invention can be employed for the coloration of the materials named herein by the well-known methods, employed by those skilled in the art, for the coloration of these materials.

We claim:
The disazo compound having the formula:

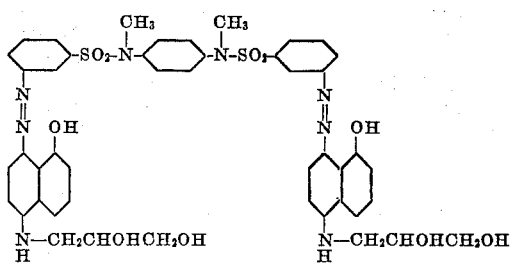

CHARLES F. H. ALLEN.
CHARLES V. WILSON.
GORDON F. FRAME.

REFERENCES CITED

The following references are of record in the file of this patent:

UNITED STATES PATENTS

| Number | Name | Date |
|---|---|---|
| 1,878,471 | Dobmaier | Sept. 20, 1932 |
| 1,896,450 | Lange | Feb. 7, 1933 |
| 2,275,130 | Cliffe et al. | Mar. 3, 1942 |

FOREIGN PATENTS

| Number | Country | Date |
|---|---|---|
| 475,938 | Great Britain | Nov. 26, 1937 |
| 488,792 | France | July 22, 1918 |
| 501,131 | Great Britain | Feb. 14, 1939 |
| 502,420 | Great Britain | Mar. 16, 1939 |
| 514,093 | Great Britain | 1938 |
| 514,353 | Great Britain | 1938 |

Certificate of Correction

Patent No. 2,448,853.  September 7, 1948.

CHARLES F. H. ALLEN ET AL.

It is hereby certified that error appears in the printed specification of the above numbered patent requiring correction as follows: Column 14, line 39, for the word "absence" read *presence*; and that the said Letters Patent should be read with this correction therein that the same may conform to the record of the case in the Patent Office.

Signed and sealed this 23rd day of November, A. D. 1948.

[SEAL]

THOMAS F. MURPHY,
*Assistant Commissioner of Patents.*